April 3, 1962   R. CHAPMAN   3,028,293
APPARATUS FOR MAKING COMPOSITE BOARD PRODUCT
Original Filed March 26, 1956   2 Sheets-Sheet 1
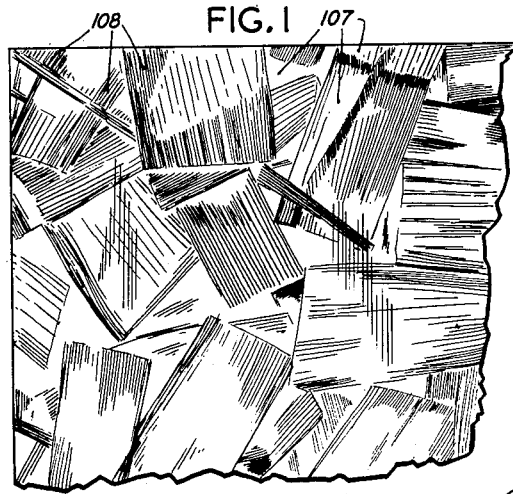
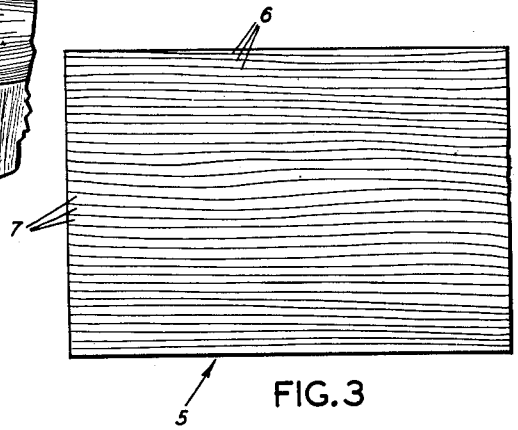
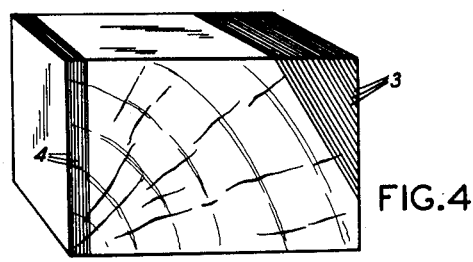
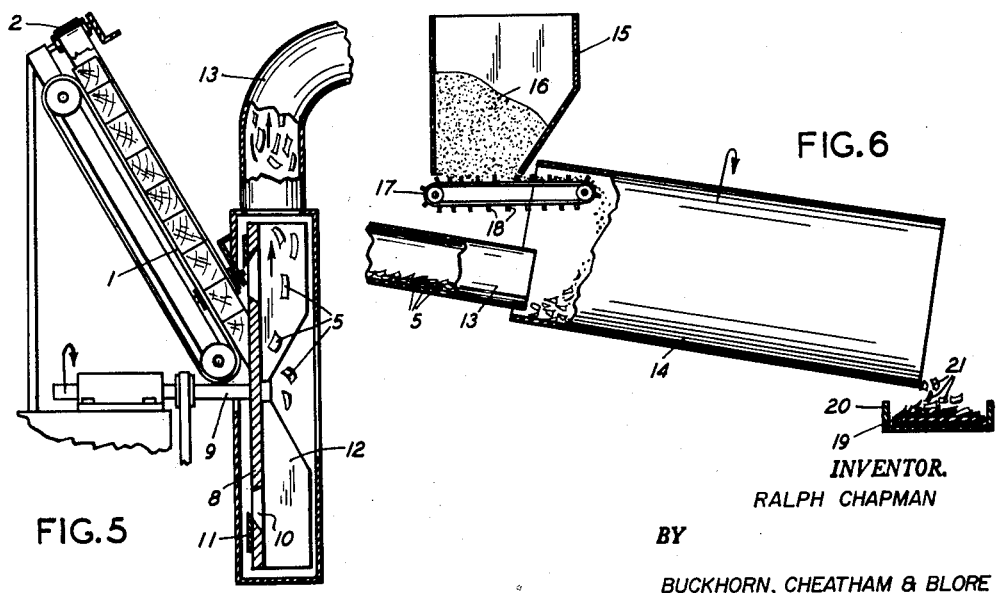
INVENTOR.
RALPH CHAPMAN
BY
BUCKHORN, CHEATHAM & BLORE
ATTORNEYS April 3, 1962 R. CHAPMAN 3,028,293
APPARATUS FOR MAKING COMPOSITE BOARD PRODUCT
Original Filed March 26, 1956 2 Sheets-Sheet 2
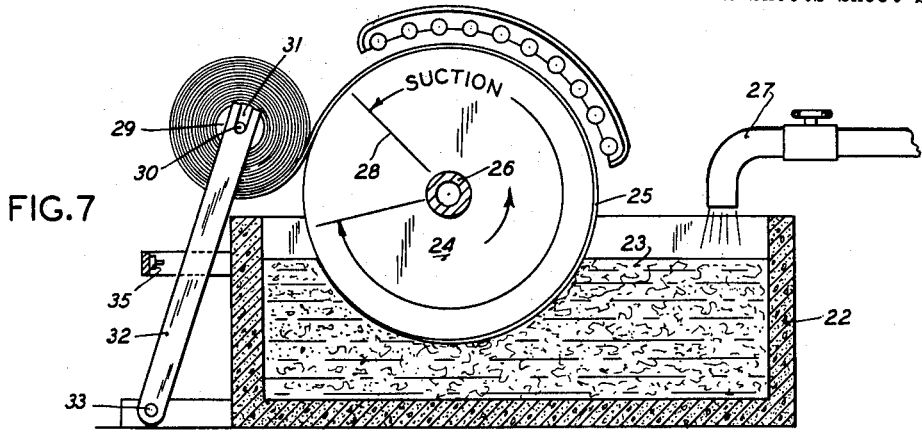
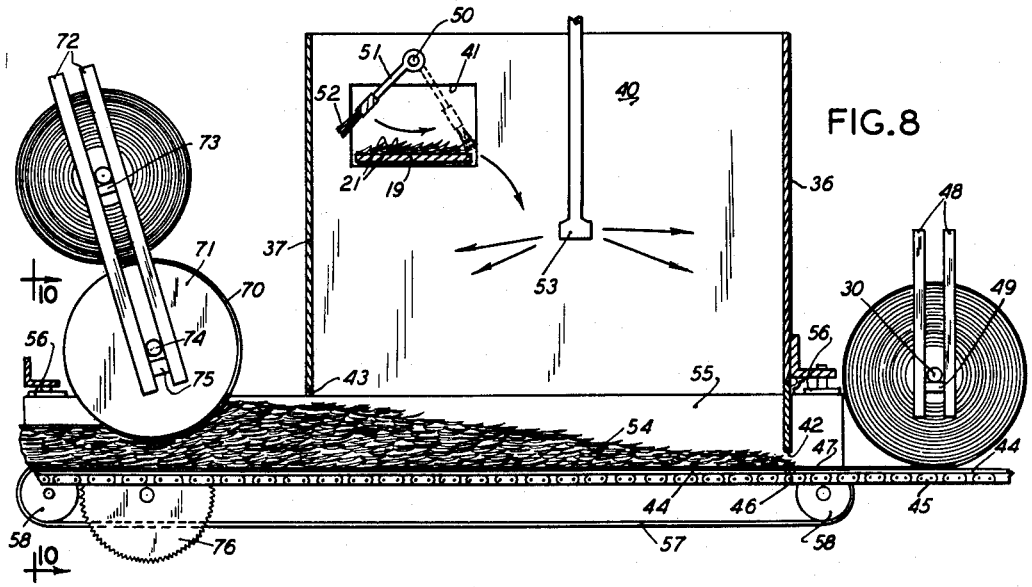
INVENTOR.
RALPH CHAPMAN
BY
BUCKHORN, CHEATHAM & BLORE
ATTORNEYS United States Patent Office 3,028,293
Patented Apr. 3, 1962

3,028,293
APPARATUS FOR MAKING COMPOSITE
BOARD PRODUCT
Ralph Chapman, Corvallis, Oreg., assignor to Wood Processes, Oregon Ltd., Corvallis, Oreg., a partnership
Original application Mar. 26, 1956, Ser. No. 573,897, now Patent No. 2,947,654, dated Aug. 2, 1960. Divided and this application Nov. 3, 1959, Ser. No. 850,580
6 Claims. (Cl. 156—372)

This application is a division of my co-pending application Serial No. 573,897, filed March 26, 1956, now Patent No. 2,947,654, granted on August 2, 1960, which in turn is a continuation-in-part of my co-pending application Serial No. 487,753, filed February 14, 1955.

The present invention relates to apparatus for forming composite board products from wood particles such as flakes of veneer, sawdust, hog fuel, chips, shavings and the like. A preferred form of product as disclosed and claimed in the above-identified applications is formed of veneer flakes and a suitable adhesive compacted together between surface skins of consolidated interlaced cellulosic fibers, the final product having a density in the order of 0.5 to 0.75; however, it is to be appreciated that the present invention may be utilized in the manufacture of other types of board products composed essentially of discrete wood particles.

The object of the present invention is to provide apparatus for uniformly depositing the discrete particles on caul plates or other suitable means to maintain the so-formed deposit in mat form so that it may be subjected to heat and pressure to consolidate the loose mass into the final product.

The foregoing will be more readily understood by reference to the accompanying drawing taken in connection with the following specification, wherein like numerals refer to like parts throughout and in which a form of the apparatus of the present invention is illustrated and described.

In the drawing:

FIG. 1 is a plan view of a portion of a composite board product made by apparatus including the present invention;

FIG. 2 is a side view of a portion of the product, showing the edge structure thereof;

FIG. 3 is a plan view of a typical veneer flake embodied in the board product;

FIG. 4 is a perspective view of a wood block from which the veneer flakes are formed showing two manners of slicing the block to form the veneer flakes;

FIG. 5 is a vertical section through a schematic representation of one form of machine in which wood blocks may be diagonally sliced into veneer flakes;

FIG. 6 is a side elevation, with parts broken away on a vertical central plane, of a schematic representation of one form of equipment for applying adhesive to veneer flakes or other wood particles;

FIG. 7 is a vertical section through a schematic representation of a form of cylinder machine for forming wet blankets of cellulosic fiber utilized to provide the surface skins of one type of board product which may be made in equipment utilizing the present invention; and FIG. 8 is a vertical section through a schematic representation of one form of equipment for forming a sandwich of veneer flakes or other wood particles between wet blankets of cellulosic fiber, the equipment including the apparatus of the present invention.

In forming the product as illustrated, veneer flakes are sliced from waste wood, such as mill ends of lumber, scraps from furniture factories, slab wood or logs. It is preferable to use blocks approximately two inches thick, three inches long with the grain, and of any width, the blocks being cut for this purpose from mill ends of lumber by means of gang saws. These blocks are best formed from lumber which has been soaked or steamed, or are still in the green condition, so as normally to contain about thirty to fifty percent water by weight. A typical block is shown in FIG. 4. A plurality of these blocks are oriented and fed successively into a machine for slicing them into veneer flakes, such as schematically illustrated in FIG. 5, this machine comprising a feeding mechanism including a driven, endless belt 1 forming the bottom of a trough, and a pair of such driven, endless belts forming the sides of the trough, such as the one indicated by the numeral 2. The angle of the trough may vary from nothing to sixty degrees. It will be seen that slicing the block on the diagonal, along the lines 3 in FIG. 4, results in the formation of a number of veneer flakes of variable width, uniformly the length of the block, and uniformly thick, the preferred flake ranging in width up to three or four inches. The flakes may range in thickness from 0.010 to 0.030 inch in thickness with an optimum thickness of approximately twenty thousandths of an inch. While it may be desirable to employ diagonal slicing so as to form a certain percentage of narrow veneer flakes, it is not necessary, and veneer flakes may be formed by vertical slicing along the lines 4 indicated in FIG. 4. Each veneer flake 5, however formed, will have the grain of the wood extending longitudinally as indicated by the alternate growth rings 6 and soft wood 7 in FIG. 3, so as to be straight-grained.

The driven belts 1 and 2 of the veneer flake slicing machine frictionally force the blocks against the face of a cutter disc 8 which is mounted upon a shaft 9 extending to one side and connected to any suitable source of power through a speed controlling means (not shown) whereby the number of veneer flakes produced per increment of time may be controlled. The disc is provided with several openings 10, adjacent each of which are provided veneer flake slicing knives 11 which slice the blocks into the veneer flakes 5. The thickness of the veneer flakes is uniformly controlled by variably setting the projection of the knife edges with respect to the face of the cutter disc against which the blocks rest between engagement by the knives. The veneer flakes so formed are propelled by fan blades 12 fixed to the disc 8 into an exhaust tube 13 by means of which the veneer flakes are conducted to an adhesive applying mechanism schematically illustrated in FIG. 6.

The tube 13 conducts the moist veneer flakes into the upper end of a tumbling cylinder 14 which is inclined downwardly away from the tube and is provided with any suitable interior construction whereby the veneer flakes are alternately lifted and permitted to fall through the interior of the cylinder while traversing its length. Adjacent the upper end of the cylinder is an adhesive supply bin 15 in which there is a supply of dry powdered adhesive as indicated at 16. At the bottom of the bin 15 there is provided an adhesive metering device schematically illustrated by an endless belt conveyor 17 having spaced lugs 18 thereon, each of which pushes a certain amount of adhesive out of the bin and discharges it into the upper end of the tumbling cylinder, the rate of discharge being controlled by variable speed drive means (not shown) connected to the driving roll for the conveyor 17.

While any suitable form of adhesive could be utilized, it is preferred, for reasons of economy, ease of handling storage life, and quality of finished product, that a powdered protein adhesive be used. While numerous such adhesives exist, such as casein glue and the like, it is preferred that a soya bean adhesive, preferably raw soya bean flour, be utilized. From about five to about fifteen percent by weight of dry adhesive to the weight of dry wood is introduced, about ten percent being economical and giving desired strength and other qualities. The tumbling of the moist veneer flakes together with the dry, powdered adhesive causes the veneer flakes to be uniformly coated throughout their surfaces with the adhesive. The coated veneer flakes drop from the lower end of the tumbling cylinder onto a conveyor belt 19 in a trough 20, which conveyor belt conveys the veneer flakes to the forming equipment. At this point the veener flakes are "adhesive coated veneer flakes" indicated by the numeral 21.

The composite board product illustrated comprises the result of consolidating a sandwich of the adhesive coated veneer flakes between wet blankets of interlaced cellulosic fibers. The wet blankets may be suitably formed in several manners, a preferred manner being schematically indicated in FIG. 7, the equipment therein illustrated being a form of cylinder machine for forming webs of fibrous materials. This machine comprises a tank 22 in which a slurry of fibers in water suspension is placed as indicated at 23. The fibers employed may be formed from any suitable raw material of cellulosic nature such as wood, straw, ramie and others utilized to make paper or pulp products. For reasons of economy the fibers are preferably provided by reclaiming ledger or bond paper, newspapers or magazines, or mixtures of the same. The slurry is of the proper consistency for suction formation, such as about three quarters of one percent fibers by weight to the weight of water employed. A driven suction cylinder 24 rotates about a horizontal axis, with the lower portion of its periphery dipping into the slurry. The speed of rotation of the cylinder, or the suction force, or the consistency of the slurry, may be varied to determine the thickness of a continuously formed blanket 25 of cellulosic fibers formed on the surface of the cylinder by the application of suction through the screen, or "wire" surface thereof, the water so withdrawn being discharged through the hollow hub 26 of the cylinder as is well known in such devices. The slurry is replenished in proportion to the withdrawal of fibers therefrom through a supply pipe 27. Suction is maintained to reduce free water and to hold the formed blanket of fibers on the surface of the cylinder to the point indicated at 28, then the suction is relieved and the blanket 25 is withdrawn from the surface of the drum by rolling it onto a mandrel 29 having trunnions 30 at its ends which rest in slots 31 at the upper ends of arms 32 pivoted near the bottom of the tank on pivots 33. The arrangement is such that the mandrel placed in the slots 31 rests against the surface of the cylinder, then the leading edge of a blanket is started around the mandrel by well-known means available for this purpose, or manually. As soon as the blanket is wrapped around the mandrel at least once it will continue to spirally wind itself onto the mandrel to the desired extent, whereupon the roll of blanket is cut loose from the cylinder. Preferably this occurs when the size of the roll of blanket on the mandrel has increased to such an extent that one of the arms 32 engages a switch 35 which stops the suction machine and actuates a bell or other alarm. The operator is thus made aware that the machine has formed a roll of the desired size, and the machine and supply of pulp thereto are automatically stopped by control means (not shown) until the finished roll is removed and a new mandrel brought into position. The finished rolls of blanket material are utilized in the sandwich forming machine of FIG. 8.

In FIG. 8 it is seen that the conveyor 19 brings the coated veneer flakes 21 into a forming bin having a front wall 36, a rear wall 37 and side walls 40, the side walls being provided with openings 41 through which the conveyor belt 19 passes. A stretch of conveyor belt between the side walls is horizontal and no guards are provided to hold the veneer flakes on the belt. The front wall 36 is provided with a narrow, horizontal slot 42 adjacent its lower edge, and the rear wall 37 is provided with a wide, horizontal slot 43 adjacent its lower edge. A movable succession of caul plates 44, slightly spaced from each other, forms a horizontal bottom wall of the forming bin. These caul paltes may be of any suitable metal of sufficient rigidity to maintain plane surfaces, being preferably formed of an aluminum alloy and being about one quarter inch in thickness. They are fed endwise along the bottom of the bin by chain conveyors 45 having lugs 46 thereon which engage the rear edges of the caul plates and space them about one half inch apart. The caul plates are preferably about two inches wider and two inches longer than the desired finished board. The width of the blanket 25 is the same as the width of the caul plates, in other words approximately two inches wider than the finished product.

A first roll of wet blanket indicated at 47 is positioned on the caul plates 44 in advance of the wall 36. To achieve this, the trunnions 30 of a mandrel on which a roll is formed are retained between upright bars 48 and rested on crossbars 49 whereby the roll may be held in position above the caul plates. The mandrel 29 comprises antifriction bearings (not shown) whereby when the leading edge of the wet blanket is laid upon a caul plate the friction of the blanket on the caul plate causes the blanket to be unrolled from the mandrel. Suitable braking means (not shown) are employed to prevent the roll from overrunning. The wet blanket 47 serves as conveyor upon which the veneer flakes or particles within the bin are deposited and moved. Mounted above the stretch of the conveyor belt 19 within the forming bin there is a horizontal, driven shaft 50 provided with radial arms 51 which support a broom 52 extending from side to side of the bin, or from edge to edge of the caul plates. The rate of revolution of the shaft 50 is such that the broom sweeps the coated veneer flakes from the conveyor belt just at the moment when the leading veneer flakes reach the far side wall, without allowing any veneer flakes to pass through the bin. That is, the interval between sweeping movements of the broom and forward movement of the belt conveyor 19 are so synchronized that particles on the belt conveyor will move from the entrance to the bin to the opposite side of the bin in one broom sweeping interval. The veneer flakes fall freely through the space within the box, fluttering as they fall since they are quite light. Gentle airstreams are blown through ducts 53 toward the end walls 36 and 37 for a purpose to be explained.

The layer of veneer flakes is built up to a depth of several inches, the exact depth depending upon the thickness desired for the finished product. The air blowing toward the end walls 36 and 37 causes the narrower veneer flakes to be blown toward the ends of the bin. Thus the narrower veneer flakes which are blown toward the entering end wall 36 are laid down as a layer of "fines" on the surface of the lower wet blanket 47 as it enters the bin. The speed of the conveyor chains 45 is such that an interleaved mass 54 of coated veneer flakes is built up to the desired thickness in the form of a wedge of material with its maximum height near the exit end wall 37, and the airstreams directed toward the end wall cause more "fines" to be deposited as the upper layer of the mass 54 as it leaves the forming bin. It is to be appreciated that this result will come about regardless of whether the veneer flakes are sliced on the diagonal of the blocks or vertically with respect to the blocks. More such "fines" will be created if diagonal slicing is employed. However, a certain amount will be formed if vertical slicing is employed since the veneer flakes are so thin that a number of them are split into variable widths as the veneer flakes travel through the duct 13 and the adhesive tumbling machine.

A pair of endless side belts 55 mounted upon vertical rollers 56 are positioned at the sides of the bin with their adjacent flights passing through slots in the end walls and extending inside of the walls 40, these belts being driven in unison with the caul plate conveyor so that the sides of the mass of veneer flakes are progressed forwardly without being disturbed. The side portions of the mass extending beyond the caul plates are supported upon a pair of endless belts 57 passing about rollers 58, these belts also moving in unison with the conveyor 45.

As the lower wet blanket 47 of cellulosic fiber and interleaved mass 54 of the coated veneer flakes emerge from the forming bin, an upper wet blanket 70 of cellulosic material is positioned thereon by the following means. A second roll of blanket material is positioned above a driven pressure roll 71 which rests upon the material. The trunnions 30 of the roll of material are guided between bars 72 and rest on crossbars 73. The pressure roll 71 is provided with trunnions 74 which are likewise guided by the bars 72, but the roll is free to rise and fall, being held from falling too far by stops 75. The pressure roll weighs about 600 pounds so that the pack of material is greatly compressed. The wet blanket passes around the pressure roll and is laid thereby upon the upper surface of the interleaved veneer flake mass 54. The weight of the roll 71 is such that a mass of interleaved veneer flakes four inches deep is compressed to about two inches in thickness, but springs back to about three inches in thickness as it leaves the roll. The roll 71 is driven by suitable means (not shown) at the same peripheral speed as the speed of the conveyor 45.

The material on the caul plate leaves the forming bin in the form of an endless ribbon and is thereafter cut into sections of appropriate length by means guided to cut the ribbon transversely above the spaces between adjacent caul plates as set forth in the above-identified application Serial No. 573,897, the separated mats being thereafter consolidated as described in said application. After consolidation, the edges of the consolidated board products are trimmed to form panels of a desired size.

Having illustrated and described a form of the present invention, it is to be appreciated that variations in arrangement and detail thereof will readily occur to those skilled in the art. I claim all such modifications as come within the true spirit and scope of the appended claims as being my invention.

I claim:

1. Apparatus for forming a continuous ribbon of loosely matted, cellulosic particles from which board materials may be made comprising a first horizontally disposed conveyor of a type suitable to support a mass of loosely deposited cellulosic particles, a second horizontally disposed conveyor extending transversely with respect to said first conveyor at an elevation above said first conveyor, means to deposit a stream of particles on said second conveyor, and a broom extending substantially the width of said first conveyor sweeping across said second conveyor at intervals, said broom and said second conveyor being so synchronized that particles on said second conveyor above one edge of said first conveyor will move to a point above the other edge of said first conveyor during one broom sweeping interval, whereby said broom will remove the particles therefrom and scatter them uniformly from side to side of said first conveyor.

2. Apparatus for forming a continuous ribbon of loosely matted, cellulosic particles from which board materials may be made comprising a first, continuously moving, horizontally disposed conveyor of a type suitable to support a mass of loosely deposited cellulosic particles, a second, continuously moving, horizontally disposed conveyor extending transversely with respect to said first conveyor at an elevation above said first conveyor, means to deposit a regular stream of particles on said second conveyor, and a broom extending substantially the width of said first conveyor sweeping across said second conveyor at regular intervals, said broom and said second conveyor being so synchronized that particles on said second conveyor above one edge of said first conveyor will move to a point above the other edge of said first conveyor during one broom sweeping interval, whereby said broom will remove the particles therefrom and scatter them uniformly from side to side of said first conveyor.

3. Apparatus for forming a continuous ribbon of loosely matted, cellulosic particles from which boardlike panels may be made comprising a first horizontally disposed conveyor, a succession of caul plates disposed horizontally and in end-to-end relation on said first conveyor, a second conveyor extending transversely with respect to said first conveyor at an elevation above said first conveyor, means to deposit a uniform stream of cellulosic particles on said second conveyor, and a broom extending substantially the width of said caul plates sweeping across said second conveyor at regular intervals, said broom and said second conveyor being so synchronized that particles on said second conveyor above one edge of said caul plates will move to a point above the other edge of said caul plates during one broom sweeping interval, whereby said broom will remove the particles therefrom and scatter them uniformly from side to side of said caul plates.

4. Apparatus for forming a continuous ribbon of loosely matted, cellulosic particles from which boardlike panels may be made comprising a first, constantly moving conveyor, a succession of caul plates disposed horizontally and in end-to-end relation on said first conveyor, a second constantly moving conveyor extending transversely with respect to said first conveyor at an elevation above said first conveyor, means to deposit a uniform stream of cellulosic particles on said second conveyor, a broom extending substantially the width of said caul plates sweeping across said second conveyor at regular intervals, said broom and said second conveyor being so synchronized that particles on said second conveyor above one edge of said caul plates will move to a point above the other edge of said caul plates during one broom sweeping interval, whereby said broom will remove the particles therefrom and scatter them uniformly from side to side of said caul plates, and means to vary the rate of deposit of said particles on said second conveyor whereby to control the thickness of the ribbon formed on said caul plates.

5. Apparatus for forming a continuous ribbon of loosely matted, cellulosic particles having substantially uniform thickness throughout comprising a first conveyor including an endless succession of horizontally disposed caul plates, bin means defining a vertically enclosed space above said first conveyor, a second conveyor of the belt type extending transversely with respect to said first conveyor at an elevation above said first conveyor, said bin means having openings in opposed walls thereof through which said belt-type conveyor extends, means to deposit cellulosic particles uniformly and continuously on said second conveyor, and a broom extending from side to side of said bin means sweeping across said second conveyor at regular intervals, the movement of said broom and second conveyor being so synchronized that particles on said second conveyor entering the bin through the opening in one opposed wall will move to the other opposed wall in one broom sweeping interval, whereby the particles are scattered into said bin means uniformly from side to side thereof, without any particles passing through said bin means on said second conveyor.

6. Apparatus for forming a continuous ribbon of loosely matted, cellulosic particles having substantially uniform thickness throughout comprising a first conveyor including an endless succession of horizontally disposed caul plates, bin means including opposed end and side walls defining a vertically enclosed space above said first conveyor, a second conveyor of the belt type extending transversely with respect to said first conveyor at an elevation above said first conveyor, said side walls having openings through which said belt-type conveyor extends, means to deposit cellulosic particles uniformly and continuously on said second conveyor outside of said bin means, a broom extending from side to side of said bin means sweeping across said second conveyor at regular intervals, the broom sweeping interval being synchronized with the rate of travel of said second conveyor whereby the broom sweeps the particles from said second conveyor at the moment the leading particles reach the far side wall of said bin means towards which the leading particles are moving, without allowing any particles to pass through said bin means, whereby all of the particles on said second conveyor within said bin means are removed therefrom and scattered into said bin means uniformly transversely from side to side thereof, and means disposed within said bin means to direct finer cellulosic particles toward said end walls.

References Cited in the file of this patent

UNITED STATES PATENTS

| | | |
|---|---|---|
| 2,624,079 | Duvall | Jan. 6, 1953 |
| 2,737,997 | Himmelheber | Mar. 13, 1956 |
| 2,744,848 | Mottet | May 8, 1956 |
| 2,947,654 | Chapman | Aug. 2, 1960 |